United States Patent [19]
William

[11] 3,998,106
[45] Dec. 21, 1976

[54] SELECTIVE FLOTATION MECHANISM FOR A PENDULOUS ACCELEROMETER PROOF MASS

[75] Inventor: Albert William, Boonton, N.J.

[73] Assignee: The Singer Company, Little Falls, N.J.

[22] Filed: June 30, 1975

[21] Appl. No.: 591,434

[52] U.S. Cl. .............................................. 73/516 R
[51] Int. Cl.² ........................................ G01P 15/08
[58] Field of Search ............. 73/515, 516 R, 517 B, 73/503

[56] References Cited
UNITED STATES PATENTS

| 2,942,475 | 6/1960 | Johnson | 43/516 R |
| 2,943,493 | 7/1960 | Bosch et al. | 73/503 |
| 3,331,253 | 7/1967 | Morris | 73/517 B |

Primary Examiner—James J. Gill
Attorney, Agent, or Firm—T. W. Kennedy

[57] ABSTRACT

The proof mass of a pendulous accelerometer is floated in a liquid metal such as mercury which has high surface tension and non-wetting characteristics within a specially designed cavity such that neutral bouyancy conditions are achieved for all principle axes except the input axis.

9 Claims, 4 Drawing Figures

U.S. Patent  Dec. 21, 1976  3,998,106
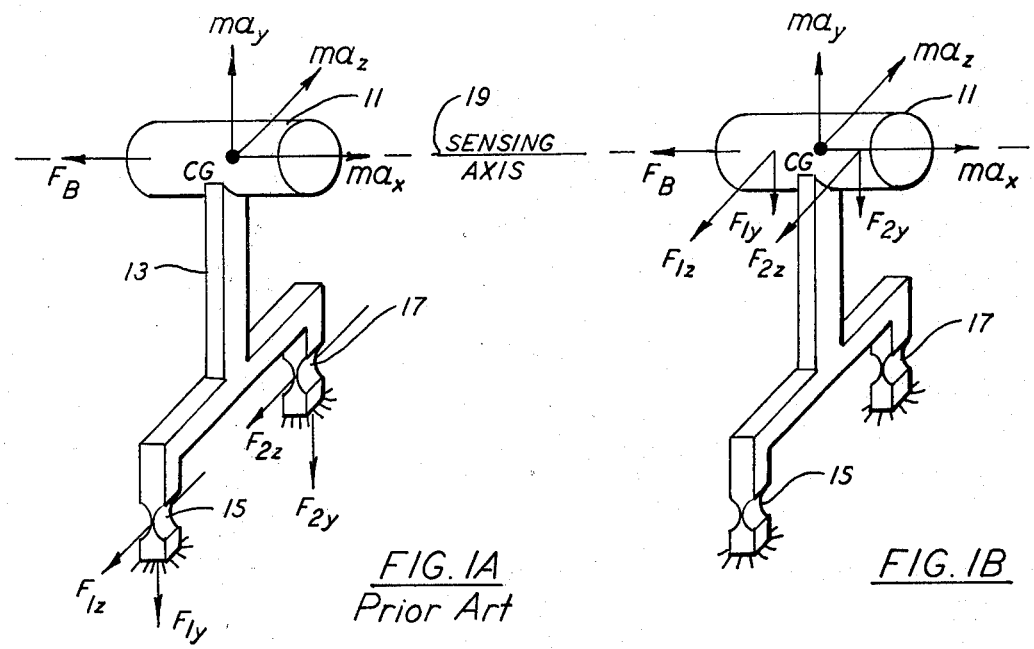
FIG. 1A
Prior Art
FIG. 1B
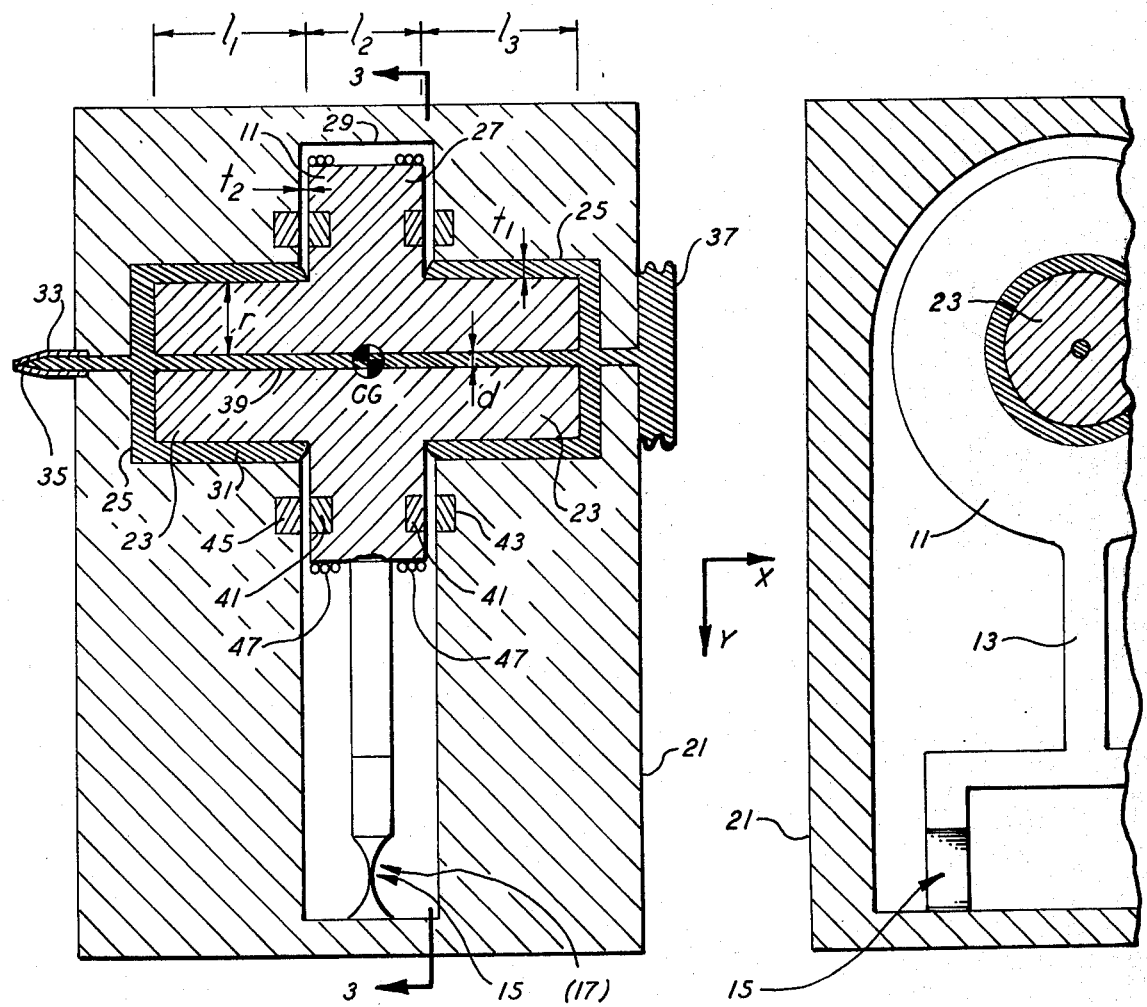
FIG. 2
FIG. 3

SELECTIVE FLOTATION MECHANISM FOR A PENDULOUS ACCELEROMETER PROOF MASS

BACKGROUND OF THE INVENTION

This invention relates to pendulous accelerometers in general and more particularly to an improved pendulous accelerometer in which the proof mass is floated in a liquid metal.

Accelerometers of the pendulous type are well known. For example, such accelerometers are disclosed in U.S. Pat. Nos. 3,680,393, 3,438,266, 3,513,711, 3,344,675 and 3,789,672. In each of these prior art devices the accelerometer comprises a proof mass which is supported to pivot about a pendulum pivot point. In general terms, means are provided to electrically sense the displacement of the proof mass from a neutral position and torquing means responsive thereto to move the proof mass back to the neutral position. In some of these prior art devices, various fluids are used in the area between the proof mass and casing to provide damping. In each case the fluid is a type of fluid which will wet the proof mass.

Although these prior art accelerometers work quite well, they do suffer from a number of disadvantages. The flexure joint which comprises the pendulum pivot point must take up the inertial forces when the proof mass experiences an acceleration along the pendulum axis or an axis normal thereto. The reaction forces occuring at the flexure cause stresses and limit the degree to which the flexure can be made angularly compliant and linearly stiff. For an ideal accelerometer, the flexure would have infinite angular compliance and infinite linear stiffness. However, such is not possible in practice and as a result these prior art devices do not attain the ideal suspension because they have high angular stiffness and a sensitivity to cross axis accelerations. Furthermore, particularly in accelerometers damped by liquids, the density and viscosity of the damping fluid is temperature sensitive and can result in errors unless compensating means are provided.

In view of these various deficiencies, the need for an improved pendulous accelerometer which more nearly approaches the ideal and is less sensitive to temperature becomes evident.

SUMMARY OF THE INVENTION

The present invention provides such an accelerometer. To accomplish this, the proof mass is supported within a specially shaped case floated on a liquid metal such as mercury. Along the two axes normal to the input axis, floatation is such as to obtain neutral bouyancy. However, the construction of the proof mass with respect to the case is such as to leave a pair of gaps in planes perpendicular to the input axis, which gaps are thin enough that the liquid metal will not fill them. This permits having a non-neutral bouyancy condition along the input axis and permits the accelerometer to respond to accelerations along that axis. However, because of the neutral bouyancy along the other two axis, the flexures do not experience loads and instead serve only to reference the location of the proof mass relatively to the case and to establish the pendulum axis. Elimination of these loads permits the flexures to be made more compliant or the proof mass to be made more massive. As a result, there are lower bias accelerations, improved stability and higher electrical to mechanical stiffness ratios when operating in a closed loop mode. In addition, the accelerometer of the present invention exhibits reduced cross axis acceleration sensitivity.

The liquid metal in addition to providing its bouyancy function also acts to damp the proof mass. This is accomplished by means of a channel bored through the proof mass through which the liquid metal can flow as the proof mass is displaced. In addition, the use of a liquid metal such as mercury for damping has advantages since such metals have low sensitivity to temperature. In other words, their density and viscosity are not greatly effected by temperature changes. Thus, the accelerometer will be less sensitive to temperature change than those using conventional damping fluids.

BRIEF DESCRIPTION OF THE DRAWINGS

FIG. 1a is a perspective schematic view illustrating the forces present in a conventional accelerometer.

FIG. 1b is a similar illustration of the forces in the accelerometer of the present invention.

FIG. 2 is a cross-sectional view along a plane containing the input axis and pendulum axis.

FIG. 3 is a partial cross section through the view of FIG. 2.

DETAILED DESCRIPTION OF THE PREFERRED EMBODIMENT

FIG. 1a illustrates the forces involved in a conventional accelerometer such as that disclosed in the aforementioned U.S. Pat. No. 3,680,393. As shown, a proof mass 11 is supported on a pivoted structure 13 containing flexure joints 15 and 17. Axis 19 is the sensing axis or input axis. The acceleration induced forces which can occur along the various axis are illustrated and designated as $Ma_Y$, $Ma_Z$ and $Ma_X$. The rebalance force $F_B$ which will be generated by conventional rebalancing circuits is also indicated. As shown, the accelerations along the Y and Z Axis, i.e. the axis perpendicular to the sensing axis 19 will result in forces as indicated at the two flexure joints 15 and 17.

FIG. 1b illustrates the same arrangement but with the proof mass 11 supported for neutral bouyancy in the manner shown on FIGS. 2 and 3. Before explaining the forces associated with FIG. 1b, the design of the accelerometer of the present invention will be further explained with reference to FIGS. 2 and 3. As with prior art arrangements, the proof mass 11 is supported on a support 13 which contains flexures 15 and 17. As is conventional, the proof mass is supported within a casing 21. However, in accordance with the present invention the casing 21 and the proof mass are shaped such that two cylinderical outside portions 23 of the proof mass 11 are spaced a distane $t_1$ from corresponding cylindrical cavities 25 in the casing 21. The central portion 27 of the proof mass is made of a larger diameter fitting into a corresponding opening 29 in the casing with a gap of only $t_2$ between the portion 27 and the cavity 29. The space having the thickness $t_1$ surrounding the outer portions 23 of the proof mass 11 is filled with a liquid metal 31 such as mercury. For purposes of filling this liquid metal a fill tube 33 is provided which is then crimped off or sealed in some other fashion by a seal 35. At the other end an expansion bellows 37 is provided to take up any expansion of the liquid metal. The proof mass 11 has a channel 39 bored through the center thereof to permit flow of the liquid metal 31 as the proof mass moves from side to side. In conventional fashion, coils 41 are located on the proof mass 11 and coils 43 and 45 in the casing 21. In addition, torquing windings 47 are also provided on the proof mass 11. These windings correspond to similarly installed windings in an accelerometer such as that disclosed in U.S. Pat. No. 3,680,393 and the restoring force $F_B$ referred to above is generated thereby. The circuit disclosed in that patent may be used with the present accelerometer. In addition, any other conventional sensing and torquing system may also be used.

By making the gap of the outer portions 23 of a thickness $t_1$ and the gap at the central portion only a thickness of $t_2$ where $t_2$ is smaller than $t_1$, the liquid metal, because of its high surface tension and non-wetting characteristics, will not flow into the small gap $t_2$ but will completely surround and float the proof mass 11 at the ends 23.

It then becomes possible to establish neutral bouyancy for accelerations along the Y and Z axis but not along the X axis. As a result, the proof mass will react only to acxcelerations along the input [X] axis.

The manner in which is accomplished can be seen through reference to FIG. 1b and the derivation given below. It is assumed that the dimension $d$, i.e. the thickness of the channel 39 through the proof mass and the dimension $t_1$ are much less than R, the radius of the portions 23 of the proof mass and $l_a$ and $l_2$ the lengths, respectively, of the sections 23 and 27. Under these conditions it is possible to make the buoyant forces in the Y and Z directions equal to the respective forces $Ma_Y$ and $Ma_Z$ by making the displaced mass of mercury equal to the mass of the proof mass. With reference to FIG. 1b, it can be seen that neutral bouyancy will exist in the Y direction when the following condition is satisfied:

$$Ma_Y = F_{1Y} + F_{2Y} = 2\pi r^2 l_1 \rho_{av} \quad (1)$$

where $\rho$ equals liquid metal density. Therefore, $$M = 2\pi r^2 l_1 \rho \quad (2)$$

the same holds true for accelerations along the Z axis. However, for accelerations along the X axis, i.e. the sensing axis, neutral bouyancy is not desired. In other words, $$Ma_x \neq \pi r^2 (2l_1 + l_2)\rho \quad (3)$$

by substituting equations 2 into equation 3 and reducing the following is obtain:

$$2l_1 \neq 2l_1 + l_2 \quad (4)$$

Inspection of FIG. 2 makes it clear that this condition is met since $l_2$ is greater 0. Thus, the proof mass will not be nautrally bouyant in the X direction. Thus, the forces present in the accelerometer of the present invention dimensioned according to equation 2 will be as shown in FIG. 1b. Note that the forces are no longer present at the flexures 15 and 17. As noted above, the force rebalance $F_B$ along the X axis will be obtained by system such as that disclosed in U.S. Pat. No. 3,680,393 utilizing the coils shown on FIG. 2.

Furthermore, as the proof mass 11 moves to one side or the other, the liquid metal will flow through the channel 39 acting as a damping fluid. As noted, this type of liquid is not particularly sensitive with regard to density and viscosity. Thus, damping will remain essentially constant over a range of temperatures. Any expansion or contraction caused by temperature changes will, however, be compensated by the expansion bellows 37.

Thus, an improved accelerometer in which a proof mass is floated in liquid metal to obtain neutral boyancy so as to relieve the flexure of forces which would otherwise be present has been shown. Although a specific embodiment has been illustrated and described, it will be obvious to those skilled in the art that various modifications may be made without departing from the spirit of the invention which is intended to be limited solely by the appended claims.

What is claimed is:

1. In a pendulous accelerometer in which a proof mass is supported by means rotatable about a pivot axis in response to an acceleration along a sensing axis, said proof mass contained within a casing to which said support means are attached and movable within said casing, the improvement comprising said proof mass having a central section of a larger cross-section and two end sections of smaller cross-sections and a liquid metal filling the gaps between said smaller end sections of said proof mass and said casing so as to support said proof mass for neutral buoyancy along all axes except the sensing axis.

2. Apparatus according to claim 1 wherein the gap between said larger central portion and said casing, at the point where said gap is contiguous to the gaps surrounding said smaller end portions is of a size which will not permit the entry of said liquid metal therein because of the surface tension of said liquid metal.

3. Apparatus according to claim 2 and further including a channel through the center of said proof mass along said sensing axis.

4. Apparatus according to claim 3 wherein said center section and said end sections are both of a cylindrical cross section with their cylindrical axes on said sensing axis.

5. Apparatus according to claim 4 wherein the length of each of said smaller end sections in the direction of said sensing axis is $l_1$, the radius of each of said end sections is $r$, the mass of said proof mass is M and the density of said liquid metal is $\rho$, and wherein said device satisfies the equation: $M = 2\pi r^2 l_1 \rho$.

6. Apparatus according to claim 3 wherein said liquid metal is mercury.

7. Apparatus according to claim 3 and further including means for filling said gaps with said liquid metal.

8. Apparatus according to claim 3 and further including means to take up expansion of said liquid metal due the temperature changes.

9. Apparatus according to claim 8 wherein said means comprise an expansion bellows.

* * * * *

UNITED STATES PATENT AND TRADEMARK OFFICE
CERTIFICATE OF CORRECTION

PATENT NO. : 3,998,106
DATED : December 21, 1976
INVENTOR(S) : William Albert

It is certified that error appears in the above-identified patent and that said Letters Patent are hereby corrected as shown below:

In the heading, "William" should read --Albert--.

"[75] Inventor:   Albert William
                  Boonton, N.J."

should read

--[75] Inventor:  William Albert
                  Boonton, N.J. --

Signed and Sealed this

Twenty-sixth Day of April 1977

[SEAL]

Attest:

RUTH C. MASON
*Attesting Officer*

C. MARSHALL DANN
*Commissioner of Patents and Trademarks*